(12) United States Patent
Schmitt et al.

(10) Patent No.: US 6,403,962 B1
(45) Date of Patent: Jun. 11, 2002

(54) FIBRE OPTIC X-RAY CAMERA

(75) Inventors: Peter Schmitt, Erlangen; Randolf Hanke, Fürth; Norbert Bauer, Erlangen; Michael Maisl, Freisen, all of (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 09/445,953
(22) PCT Filed: Jun. 22, 1998
(86) PCT No.: PCT/EP98/03813
§ 371 (c)(1), (2), (4) Date: Mar. 29, 2000
(87) PCT Pub. No.: WO98/59260
PCT Pub. Date: Dec. 30, 1998

(30) Foreign Application Priority Data

Jun. 24, 1997 (DE) .......................... 197 26 884
Jun. 8, 1998 (DE) .......................... 198 25 610

(51) Int. Cl.[7] .................................................. G01T 1/20
(52) U.S. Cl. ................. 250/368; 250/361 R; 250/474.1
(58) Field of Search .......................... 250/368, 361 R, 250/370.11, 370.15, 474.1

(56) References Cited

U.S. PATENT DOCUMENTS

| | | | |
|---|---|---|---|
| 4,229,069 A | 10/1980 | Motin et al. | 350/96.29 |
| 4,669,821 A | 6/1987 | Blair et al. | 360/96.34 |
| 4,694,177 A * | 9/1987 | Akai | 250/368 |
| 5,059,800 A | 10/1991 | Cueman et al. | 250/367 |
| 5,594,253 A | 1/1997 | Bueno et al. | 250/486.1 |
| 5,698,858 A * | 12/1997 | Borner | 250/484.2 |
| 5,856,673 A * | 1/1999 | Ikegami et al. | 250/368 |
| 6,091,796 A * | 7/2000 | Trissel et al. | 378/43 |

FOREIGN PATENT DOCUMENTS

JP  9-90039  4/1997  ............. G01T/1/00

* cited by examiner

*Primary Examiner*—Huy Mai
(74) *Attorney, Agent, or Firm*—Michael A. Glenn; Kirk Wong

(57) ABSTRACT

A device for detecting X-radiation comprises a scintillator for converting X-radiation impinging thereon into light, a detecting device for detecting the light produced by the scintillator, and a fibre optic system for feeding the light produced by the scintillator to the detecting device. The device for detecting X-radiation is additionally provided with a heating means for heating at least one section of the fibre optic system to a predetermined temperature while the X-radiation is being detected.

18 Claims, 3 Drawing Sheets

FIBRE OPTIC X-RAY CAMERA

FIELD OF THE INVENTION

The present invention refers to industrial and medical radioscopy (X-ray inspection) and especially to a fibre optic X-ray camera which, due to its structural design, is suitable for use under a high level of irradiation. This property is of importance for many industrial applications where the service life of conventional X-ray cameras is insufficient.

BACKGROUND OF THE INVENTION

FIG. 2 shows a typical fibre optic X-ray camera composed of a scintillator device 20, a fibre optic system 22 and a semiconductor sensor 24. The semiconductor sensor 24 normally consists of CCD sensors or photodiode arrays. The scintillator device 20 converts an X-radiation 26, which impinges on the X-ray camera and which has passed e.g. an object 28 to be examined, into visible light whereupon the fibre optic system 22 conducts the light produced in the scintillator device 20 onto the sensor 24 which provides detection of the light with local resolution. The fibre optic system 22 replaces here a conventional lens optic system, since, in comparison with a conventional lens optic system, the fibre optic system 22 entails substantially lower losses of light; this has the effect that the sensitivity of the fibre optic X-ray camera is much higher than that of a camera comprising a lens optic system.

Fibre optic X-ray cameras can advantageously be used for all applications where a compact structural design or a high local resolution is required. As shown in FIG. 2, the fibre optic system 22 can be implemented as a so-called taper in the case of which an image of the input window is formed on a smaller output window.

However, in view of their comparatively short service life under a high level of irradiation, fibre optic X-ray cameras have not yet gained importance for industrial applications.

The reason for the short service life of this kind of camera under a high level of irradiation is to be seen in the fact that only part of the X-radiation 26 is absorbed by the scintillator device 20. In the insulator material of which the fibre optic system 22 consists, normally glass, colour centres are produced, whereby the fibre optic system 22 discolours and becomes brown and the quantity of light coming from the scintillator device 20 and arriving at the semiconductor sensor 24 decreases continuously. At a radiation dose of typically 100 kRad, the camera gets unfit for use. In the case of industrial applications, this dose may be reached within a few hours or days. According to the prior art, it was necessary to replace fibre optic systems whose quality had deteriorated in this way or to anneal them during a long interruption of operation.

DESCRIPTION OF THE PRIOR ART

U.S. Pat. No. 5,594,253 discloses a hybrid luminescent device for converting ionizing and penetrating energy, such as X-ray beams, gamma rays, neutrons, ions, electrons and the like, into visible light for display applications. The hybrid luminescent device comprises a phosphor screen arranged on the input surface of a fibre optic scintillator which can, in turn, be releasably coupled to a camera or to a some kind of recording medium.

JP 9-90039 A discloses a fibre optic radiation sensor making use of an optical fibre, which is formed by coating a core with a cover layer, and measuring the radiation dose in the vicinity of the fibre by detecting the light propagation loss of the fibre which occurs when defects are caused in the glass of the fibre by gamma rays which are present in the vicinity of the fibre. A hole extending in the longitudinal direction of the fibre is formed through the cover layer, and a metal wire, which produces heat when the wire is excited, is conducted through the hole so that the defects in the core and in the glass in the vicinity of the core can be healed effectively when the wire is excited.

U.S. Pat. No. 4,229,069 A discloses a device for remote viewing of objects located in areas with ionizing radiation fields. A fibre optic channel consisting of a bundle of fibres transmits the recorded image of an object to be viewed beyond a biological shield provided as protection against the ionizing radiation. A heat source implemented as a coil is provided for contributing to a thermal stabilization of the light conduction properties of the fibre bundle in the area with ionizing radiation by heating the fibre bundle.

SUMMARY OF THE INVENTION

It is the object of the present invention to provide a fibre optic X-ray camera which permits an improved detection of X-radiation for a long period of time.

It is a further object of the present invention to provide a method for an improved detection of X-radiation for a long period of time.

The present invention is a device for detecting X-radiation comprising:
  a scintillator for converting X-radiation impinging thereon into light;
  a detecting device for detecting the light produced by the scintillator;
  a fibre optic system for conducting the light produced by the scintillator from an input end of the fibre optic system arranged at the scintillator to an output end of said fibre optic system, the detecting device being arranged in spaced relationship with the fibre optic system and an optical means being provided between the detecting device and the fibre optic system, said optical means directing the light emerging from the fibre optic system onto the detecting device; and
  a heating means used for heating the whole fibre optic system during the detection of X-radiation to a predetermined temperature with a homogeneous temperature distribution.

The present invention is a further a method for detecting X-radiation comprising:
  converting an X-radiation into light by means of a scintillator;
  detecting by means of a detecting device the light produced by the scintillator; and
  conducting the light from an input end of the fibre optic system arranged at the scintillator to an output end of said fibre optic system;
  directing the light emerging from the fibre optic system onto the detecting device, which is arranged in spaced relationship with the fibre optic system, with the aid of an optical means provided between the detecting device and the fibre optic system; and
  heating the fibre optic system with the aid of a heating means during the detection of X-radiation to a predetermined temperature with a homogeneous temperature distribution.

The present invention is based on the finding that the problems described, which arise when a fibre optic X-ray camera is used especially under a high level of irradiation, can be reduced by heating at least part of the fibre optic system to a predetermined temperature at which the colour-centre reduction rate $v_{f-}$ is higher than or equal to the colour-centre production rate $v_{f+}$, while the X-radiation is being detected. By means of this measure, the production of colour centres during the operation of the X-ray camera is avoided to a very large extent, whereby a discolouration of the fibre optic system is prevented.

Hence, one advantage of the present invention is to be seen in the fact that an exchange of the fibre optic system or an annealing of the fibre optic system, which would entail an interruption of operation, can be dispensed with completely or is at least only necessary after an operating period that is much longer than the operating periods which have hitherto been possible.

A further advantage which the invention described hereinbelow shows in comparison with the prior art is that it permits a substantially improved service life of the fibre optic X-ray camera under a higher levels of irradition. The longer service life allows the use of this type of X-ray camera under industrial conditions for the first time.

According to a further aspect of the present invention, an improved fibre optic X-ray camera and an improved method of detecting X-radiation are provided so as to permit a long-term operation of the fibre optic X-ray camera also under higher levels of irradiation, a mechanical stress on or a non-uniform radiation resistance of the fibre optic system caused by inhomogeneous temperature distribution in the fibre optic system being avoided. The detecting device is arranged in spaced relationship with the fibre optic system and an optical means is provided between the detecting device and the fibre optic system, the optical means directing the light emerging from the fibre optic system onto the detecting device.

During operation of a fibre optic X-ray camera, i.e. especially when the fibre optic system is heated, a sensor coupled directly to the fibre optic system is exposed to high temperatures due to the fact that the fibre optic system is heated strongly. This high temperature causes a high dark signal in the sensor, and this will result in a deterioration of the image quality and in reduced dynamics of the X-ray camera.

This problem can be solved by cooling the fibre optic system on the side facing the sensor. This solution is, however, disadvantageous insofar as, due to the resultant inhomogeneous temperature distribution in the fibre optic system, high mechanical stresses have to be expected, which may result in a formation of cracks and which may therefore cause damage to the fibre optic system.

This inhomogeneous temperature distribution in the fibre optic system is also disadvantageous insofar as, in the case of a disadvantageous diameter/length ratio of the fibre optic system, the strongly inhomogeneous temperature distribution in the fibre optic system will additionally cause a locus-dependent variation of the radiation resistance and, consequently, an irregular discolouration of the fibre optic system in certain areas thereof.

The present invention is based on the finding that the above-mentioned problems entailed by an inhomogeneous temperature distribution, especially under high levels of irradiation, can be eliminated by arranging the detecting device (the sensor) in spaced relationship with the fibre optic system, the light emerging from the fibre optic system being conducted via an optical means to the sensor. Since the fibre optic system can be heated uniformly throughout its whole length, a homogeneous temperature distribution will be achieved in the fibre optic system without influencing the electronic properties of the sensor, faster heating of the whole fibre optic system being additionally possible in this way. Furthermore, due to the homogeneous temperature distribution in the fibre optic system, the occurrence of mechanical stresses in the material of the fibre optic system will be avoided to a large extent, whereby mechanical loads on the fibre optic system, which might cause damage to the fibre optic system, will be reduced extremely.

BRIEF DESCRIPTION OF THE DRAWINGS

In the following, preferred embodiments of the present invention will be explained in detail making reference to the drawing enclosed in which.

DETAILED DESCRIPTION OF THE PREFERRED EMBODIMENTS

Figure 1:
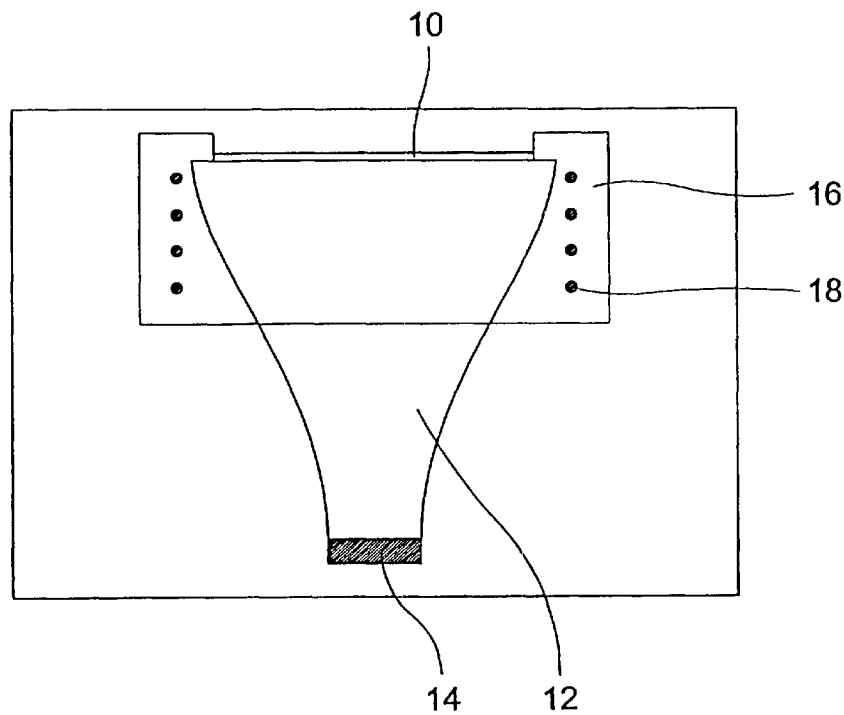
FIG. 1 shows a schematic representation of a fibre optic X-ray camera according to a first embodiment of the present invention.
Figure 2:
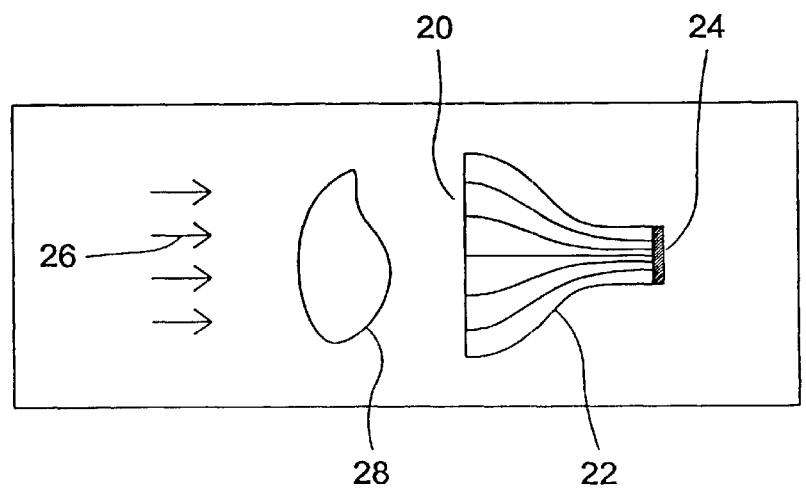
FIG. 2 shows schematically the structural design of a known X-ray inspection system comprising a fibre optic x-ray camera.

Making reference to FIG. 1, a first preferred embodiment of the device according to the present invention will now be described in detail.

A scintillator 10 is arranged on one end of a fibre optic system 12, whereas the other end of the fibre optic system 12 has arranged thereon a detecting device 14. The fibre optic system 12 is composed of a bundle comprising a plurality of glass fibres. In the embodiment shown, a holder 16 is arranged such that it encloses the scintillator 10 and at least one section of the fibre optic system 12. The holder 16 has provided therein a plurality of heating wires 18 which heat the part of the fibre optic system 12 located adjacent the scintillator 10 while the X-radiation is being detected by means of the fibre optic X-ray camera.

The scintillator 10 can be implemented e.g. either as a scintillator layer or it can be baked into the individual fibre ends of the fibre optic system 12 by doping the end sections e.g. with erbium.

The radiation-dependent discolouration occurring when fibre optic systems are operated without being heated can be reduced to a very large extent by heating the fibre optic system to a temperature in the range of 100° C. to 150° C. for several days.

Due to the X-radiation penetrating in the fibre optic system through the scintillator, colour centres are produced at a rate $v_{f+}$ depending on the radiation spectrum and the radiation dose. The present invention is based on the fact that these colour centres produced can be reduced by heating the fibre optic system 12 while the X-ray camera is in operation. When the fibre optic system 12 is heated to a temperature T, the colour centres are reduced at a rate $v_{f-}$.

It follows that a reduction of the colour centres produced can be achieved by maintaining, while the X-ray camera is in operation, the fibre optic system 12 at a temperature T at which the rate $v_{f+}$ for the production of the colour centres is smaller than or equal to the rate $v_{f-}$ for the reduction of the colour centres. The temperature required for this purpose depends, of course, on the X-ray spectrum and on the dose power arriving at the x-ray camera. In the case of the spectra and doses which are typically used at present for industrial applications, a temperature in the range of from 100° C. to 150° C. proves to be sufficient.

Since the level of irradiation of the fibre optic system 12 decreases due to absorption of the X-radiation as the thickness of the material increases, it may suffice to heat the fibre optic system 12 only on the side facing the scintillator 10, as in the case of the embodiment shown, whereas the side facing the detecting device 14, i.e. the sensor, is maintained e.g. at room temperature. Alternatively, the whole fibre optic system can be heated depending on the respective case of use; in this case, a temperature gradient from the scintillator to the sensor can be used.

In the case of the structural design of a fibre optic X-ray camera shown in FIG. 1, the fibre optic system 12 is heated via insulated heating wires 18 of a heatable holder 16 which define an electric resistance heating means, only the front part of the fibre optic system 12 being heated so as to avoid excessive heating of the detecting device 14. This arrangement is advantageous for cases of use where the X-radiation has a energy in the range of approx. 50–150 keV, since the penetration depth of the X-radiation into the fibre optic system will then be in the range of some millimetres to centimetres. If necessary, the detecting device can be cooled at the back, e.g. by a Peltier cooling element (not shown). This may be necessary e.g. when detecting devices are used whose dark signal increases strongly as the temperature increases, e.g. in the case of CCD sensors.

Alternatively to the preferred embodiment shown in FIG. 1, there is a large number of possibilities of heating the fibre optic system. The fibre optic system can, for example, be installed fully or partly in a heated housing, the heating of the fibre optic system being then also caused by thermal conduction.

However, in addition to heating by thermal conduction, other embodiments for heating the fibre optic system are realizable, which differ from the first-mentioned embodiment and which are based on convection or on a radiation.

The fibre optic system can, for example, be arranged in a housing in such a way that a closed air or gas volume is created around the fibre optic system. Heating is then effected by heating the enclosed air or a suitable protective gas, the heating of the fibre optic system being then caused by convection.

It would also be possible to heat the front side of the fibre optic system by means of a radiation, e.g. an infrared radiation.

Figure 3:
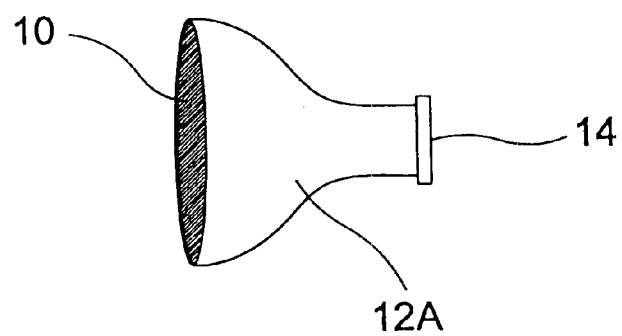
FIG. 3 shows schematically the structural design of a fibre optic X-ray camera.

To make things clearer, FIG. 3 shows a simplified representation of the schematic structural design of a fibre optic X-ray camera of the type described hereinbefore with reference to FIG. 1, which is provided with a heated fibre optic system 12A and direct sensor coupling.

In the following, additional preferred embodiments of the present invention will be described.

Figure 4:
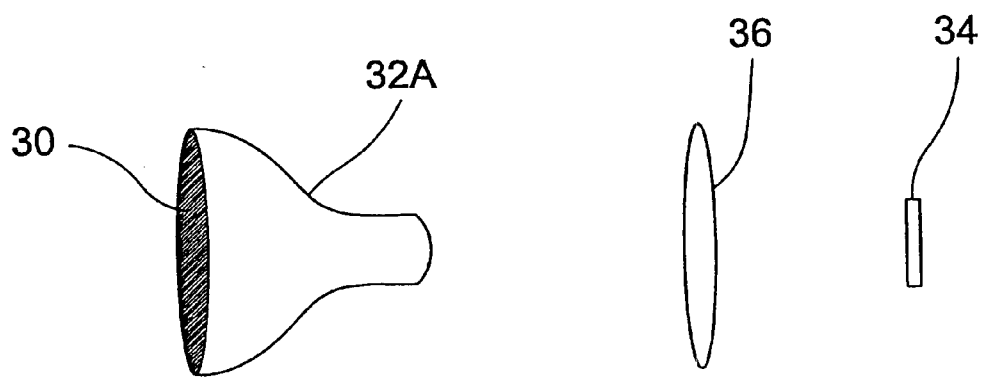
FIG. 4 shows schematically the structural design of a fibre optic X-ray camera according to a second embodiment of the present invention.

The above-described problems concerning the high mechanical stresses in the fibre optic system in view of a strongly inhomogeneous temperature distribution in the fibre optic system and an inhomogeneous radiation resistance of the fibre optic system, respectively, are caused by the direct coupling of the fibre optic system to the sensor. According to the present invention, this problem is solved by the circumstance that a sensor (a detecting device) 34 is not coupled directly to a heated fibre optic system 32A, but the output side of the heated fibre optic system 32A is imaged on the sensor 34 via a lens optic system (an objective lens) 36. Such an arrangement is schematically shown in FIG. 4. Although this coupling arrangement results in a decrease in the light-sensitivity of the fibre optic X-ray camera, it offers the advantage that the fibre optic system can be heated homogeneously and rapidly.

In the following, a further preferred embodiment of a heated fibre optic X-ray camera according to the present invention will be explained making reference to FIG. 5.

A scintillator 30 is arranged on one end of a fibre optic system 32, whereas a detecting device 34 is arranged on the other end of the fibre optic system 32 in spaced relationship with the fibre optic system 32. Between the fibre optic system 32 and the detecting device 34 an optical means 36 is provided. The fibre optic system 32 is composed of a bundle comprising a plurality of glass fibres. In the shown embodiment, a holder 38 is arranged such that it encloses the scintillator 30 and essentially the whole fibre optic system 32. The holder 38 has provided therein a plurality of heating wires 40 by means of which the whole fibre optic system 32 is heated homogeneously while the X-radiation is being detected with the aid of the fibre optic X-ray camera. The light emerging from the fibre optic system 32 is imaged on the detecting device 34 via the optical means 36.

Since the detecting device 34 is arranged in spaced relationship with the fibre optic system 32, mutually interfering thermal influences between the detecting device 34 and the fibre optic system 32 will not occur. It follows that the fibre optic system 32 can be heated in full length while the fibre optic X-ray camera is in operation, whereby a substantially homogeneous temperature distribution will be achieved in the fibre optic system 32. Due to this homogeneous temperature distribution, high mechanical stresses, which might result in the formation of cracks and which might therefore cause damage to the fibre optic system, are avoided in the fibre optic system 32. Hence, heating of the fibre optic system 32 can be effected much faster than in the arrangements described in the prior art.

Due to the very homogeneous temperature distribution achieved in the fibre optic system 32, a uniform radiation resistance of the fibre optic system 32 is additionally obtained. This uniform radiation resistance has the effect that the colour-centre reduction rate $v_{f-}$, which is equal to or higher than the colour-centre production rate $v_{f+}$ in the fibre optic system 32, assumes a uniform value throughout the whole material of the fibre optic system 32, whereby a non-uniform reduction of colour centres and, consequently, a possible non-uniform discolouration of specific areas of the fibre optic system 32 are avoided. This will largely prevent an impairment of the optical properties of the fibre optic system 32 while the fibre optic X-ray camera is in operation.

Figure 6:
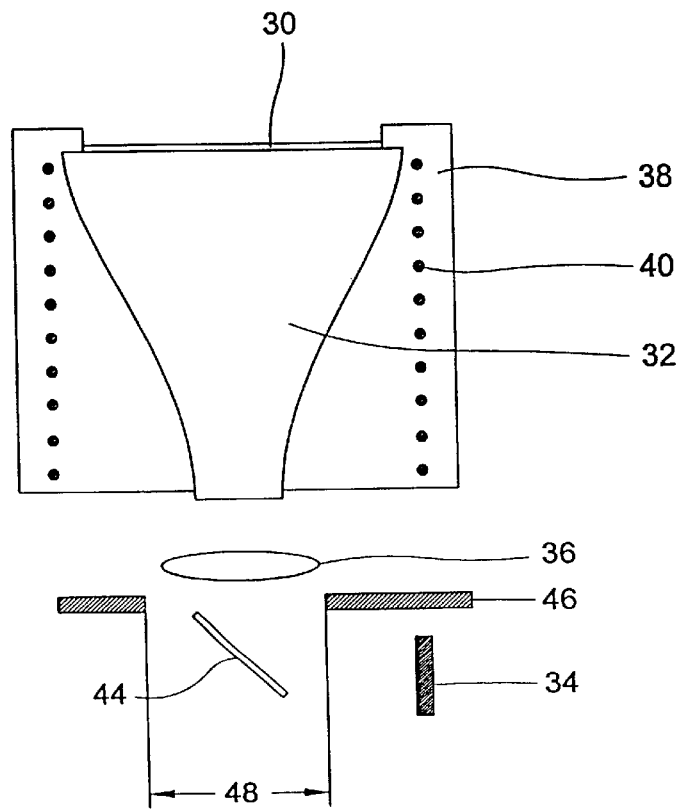
FIG. 6 shows a schematic representation of a fibre optic X-ray camera according to still another embodiment of the present invention.

In FIG. 6, a further embodiment of the present invention is shown.

Figure 5:
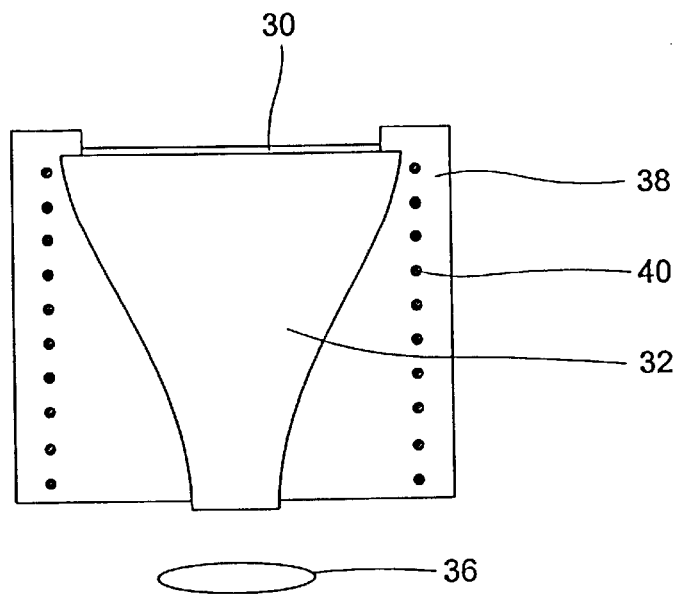
FIG. 5 shows a schematic representation of a fibre optic X-ray camera according to another embodiment of the present invention.

The arrangement comprising the scintillator 30, the fibre optic system 32, the holder 38 and the heating wire 40 corresponds to the arrangement shown in the case of the embodiment according to FIG. 5 and will therefore not be explained once more.

Other than in the case of the embodiment described hereinbefore making reference to FIG. 5, a deflecting mirror 44 is now additionally provided between the detecting device 34, which is arranged separately from the fibre optic system 32, and the objective lens 36; the light emerging from the fibre optic system 32 is conducted vie this deflecting mirror 44 tot he detecting device 34 arranged separately from the fibre optic system 32. The objective lens 36 can, however, also be arranged (not shown) at a position between the deflecting mirror 44 and the detecting device 34 without any change in the mode of operation of the arrangement. Furthermore, a shield means 46 with an opening 48 is provided between the detecting device 34, which is arranged separately from the fibre optic system 32, and the fibre optic system 32.

Since, in cases in which the energy of the X-radiation exceeds a certain limit, part of the X-radiation can penetrate the fibre optic system 32 and arrive at the detecting device 34, a deflecting mirror 44 is provided either between the fibre optic system 34 and the objective lens 36 and the detecting device 34 so that the detecting device 34 can be arranged outside of the direct X-ray beam. The detecting device 34 can additionally be protected against the X-radiation by a suitable shutter or shield means 46 consisting e.g. of lead. The size of the opening 48 in the shield means 46 is chosen such that the light emerging from the fibre optic system 32 can arrive unhindered at the detecting device 34 via the objective lens 36, which can be arranged in front as well as behind the deflecting mirror 44, and via the deflecting mirror 44.

This arrangement according to the present invention guarantees that the electric properties of the detecting device 34 are not impaired by the X-radiation penetrating the fibre optic system 32.

Summarizing, it can be stated that substantial improvements of the mechanical, optical and electronic properties of the arrangement are achieved by means of the fibre optic X-ray camera according to the present invention, whereby the service life of this type of X-ray camera will be increased still further according to the present invention, when the x-ray camera is used under industrial conditions.

What is claimed is:

1. A device for detecting X-radiation comprising:
   a scintillator for converting X-radiation impinging thereon into light;
   a detecting device for detecting the light produced by the scintillator;
   a fibre optic system for conducting the light produced by the scintillator from an input end of the fibre optic system arranged at the scintillator to an output end of said fibre optic system, the detecting device being arranged in spaced relationship with the fibre optic system and an optical means being provided between the detecting device and the fibre optic system, said optical means directing the light emerging from the fibre optic system onto the detecting device; and
   a heating means used for heating the whole fibre optic system during the detection of X-radiation to a predetermined temperature with a homogeneous temperature distribution.

2. The device for detecting X-radiation according to claim 1, wherein the heating temperature of the fibre optics system corresponds to a temperature at which a reduction rate of colour centres produced in the fibre optic system while the X-radiation is being received is equal to or higher than a production rate of the colour centres.

3. The device for detecting X-radiation according to claim 1, wherein the heating temperature is between 100° C. and 150° C.

4. The device for detecting X-radiation according to claim 1, wherein the heating means is defined by a heated housing in which at least part of the fibre optic system is housed.

5. The device for detecting X-radiation according to claim 1, wherein the heating means is defined by a heated annular holder for holding the fibre optic system.

6. The device for detecting X-radiation according to claim 1, wherein at least part of the fibre optic system is arranged in a closed gas volume, said fibre optic system being heated by heating the gas contained in said gas volume.

7. The device for detecting X-radiation according to claim 1, wherein the heating means is defined by a radiation means for irradiating at least part of the fibre optic system.

8. The device for detecting X-radiation according to claim 7, wherein the radiation means is an infrared radiation means.

9. The device for detecting X-radiation according to claim 1, wherein the detecting device for detecting the light is defined by a semiconductor sensor.

10. The device for detecting X-radiation according to claim 9, wherein the semiconductor sensor is defined by a semiconductor sensor array.

11. The device for detecting X-radiation according to claim 1, wherein the optical means is defined by a lens optic system.

12. The device for detecting X-radiation according to claim 11, wherein the optical means comprises a light deflecting arrangement which is arranged either between the fibre optic system and the lens optic system or between the lens optic system and the detecting device.

13. The device for detecting X-radiation according to claim 1, wherein the optical means is provided with a shield means for shielding the detecting device against direct irradiation by X-rays.

14. A method of detecting X-radiation comprising the following steps:
   converting an X-radiation into light by means of a scintillator;
   detecting by means of a detecting device the light produced by the scintillator; and
   conducting the light produced by the scintillator from an input end of the fibre optic system arranged at the scintillator to an output end of said fibre optic system;
   directing the light emerging from the fibre optic system onto the detecting device, which is arranged in spaced relationship with the fibre optic system, with the aid of an optical means provided between the detecting device and the fibre optic system; and
   heating the fibre optic system with the aid of a heating means during the detection of X-radiation to a predetermined temperature with a homogeneous temperature distribution.

15. The method of detecting X-radiation according to claim 14, wherein the heating temperature corresponds to a temperature at which a reduction rate of colour centres produced in the fibre optic system while the X-radiation is being received is equal to or higher than a production rate of the colour centres.

16. The method of detecting X-radiation according to claim 14, wherein a lens optic system is used an an optical means.

17. The method of detecting X-radiation according to claim 16, wherein the light emerging from the fibre optic system is deflected by means of a light deflecting arrangement disposed either between the fibre optic system and the lens optic system or between the lens optic system and the detecting device.

18. The method of detecting X-radiation according to claim 14, wherein the detecting device is shielded by means of a shielding arrangement against direct irradiation by X-rays.

* * * * *